United States Patent
Frank et al.

(10) Patent No.: US 10,404,817 B2
(45) Date of Patent: Sep. 3, 2019

(54) SYSTEMS AND METHODS FOR MEASURING TIME SPENT ASSOCIATED WITH A SOCIAL NETWORKING SYSTEM

(71) Applicant: Facebook, Inc., Menlo Park, CA (US)

(72) Inventors: Jordan William Frank, Seattle, WA (US); Hongyu Liang, Kirkland, WA (US); Itamar Rosenn, San Francisco, CA (US); Aleksander Gorajek, San Jose, CA (US); Thomas M. Lento, Menlo Park, CA (US); Fanghua Li, Newark, CA (US); Siyang Chen, Mountain View, CA (US); Vishwas Badarinath Sharma, Sunnyvale, CA (US); Paul Ashton Jones, Mountain View, CA (US); Zoe Abrams Bayen, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 314 days.

(21) Appl. No.: 15/372,216

(22) Filed: Dec. 7, 2016

(65) Prior Publication Data
US 2018/0159944 A1    Jun. 7, 2018

(51) Int. Cl.
*H04L 29/08* (2006.01)
*H04L 29/06* (2006.01)

(52) U.S. Cl.
CPC ............ *H04L 67/22* (2013.01); *H04L 67/146* (2013.01); *H04L 69/28* (2013.01)

(58) Field of Classification Search
CPC ........ H04L 67/146; H04L 67/22; H04L 69/28
USPC ........................................................ 709/224
See application file for complete search history.

(56) References Cited

U.S. PATENT DOCUMENTS

| | | | |
|---|---|---|---|
| 2015/0142953 A1* | 5/2015 | Bayen | H04L 67/22 709/224 |
| 2016/0248721 A1* | 8/2016 | Bastide | H04L 51/32 |
| 2016/0308990 A1* | 10/2016 | Bayen | H04L 67/22 |

* cited by examiner

*Primary Examiner* — Michael C Lai
(74) *Attorney, Agent, or Firm* — Sheppard Mullin Richter & Hampton LLP

(57) ABSTRACT

Systems, methods, and non-transitory computer readable media can obtain a first event stream including one or more events of a first type, where each event of the first type is associated with a timestamp. A second event stream including one or more events of a second type can be obtained, where each event of the second type is associated with a timestamp. The first event stream and the second event stream can be merged to generate information associated with a metric relating to a system, based on the timestamps associated with the one or more events of the first type and the timestamps associated with the one or more events of the second type.

14 Claims, 8 Drawing Sheets

SYSTEMS AND METHODS FOR MEASURING TIME SPENT ASSOCIATED WITH A SOCIAL NETWORKING SYSTEM

FIELD OF THE INVENTION

The present technology relates to the field of social networks. More particularly, the present technology relates to techniques for measuring user engagement or other metrics associated with social networking systems.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

The social networking system may provide a number of different applications, such as a main social networking application, a chat application, a photo application, etc. Users can spend time on various applications associated with the social networking system. For example, the main social networking application may provide user profiles for various users through which users may add connections, such as friends, or publish content items. A content item can be presented on a profile page of a user. A content item can also be presented through a feed, such as a newsfeed, for a user to view and access.

SUMMARY

Various embodiments of the present disclosure can include systems, methods, and non-transitory computer readable media configured to obtain a first event stream including one or more events of a first type, where each event of the first type is associated with a timestamp. A second event stream including one or more events of a second type can be obtained, where each event of the second type is associated with a timestamp. The first event stream and the second event stream can be merged to generate information associated with a metric relating to a system, based on the timestamps associated with the one or more events of the first type and the timestamps associated with the one or more events of the second type.

In some embodiments, the system is a social networking system, and the metric is an amount of time spent by a user of the social networking system on an application.

In certain embodiments, each of the one or more events of the first type relates to a user activity, and each of the one or more events of the second type relates to a user navigation associated with the application.

In an embodiment, an active interval cluster can be determined based on the one or more events of the first type, wherein the active interval cluster is determined based on the timestamps of the one or more events of the first type.

In some embodiments, the determining the active interval cluster comprises determining whether an interval between two events of the one or more events of the first type indicated by the timestamps of the two events exceeds a threshold value.

In certain embodiments, the active interval cluster can be attributed to one or more parts of the application indicated by the one or more events of the second type.

In an embodiment, each of the one or more events of the second type indicates a transition from a first part of the application to a second part of the application, and the attributing the active interval cluster is based on the transitions indicated by the one or more events of the second type.

In some embodiments, a third event stream including one or more events of a third type can be obtained, wherein each event of the third type is associated with at least one timestamp and relates to a functionality that is external to the application.

In certain embodiments, an interval associated with an event of the one or more events of the third type can be added to the active interval cluster.

In an embodiment, the information associated with the metric is generated in or near real time.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
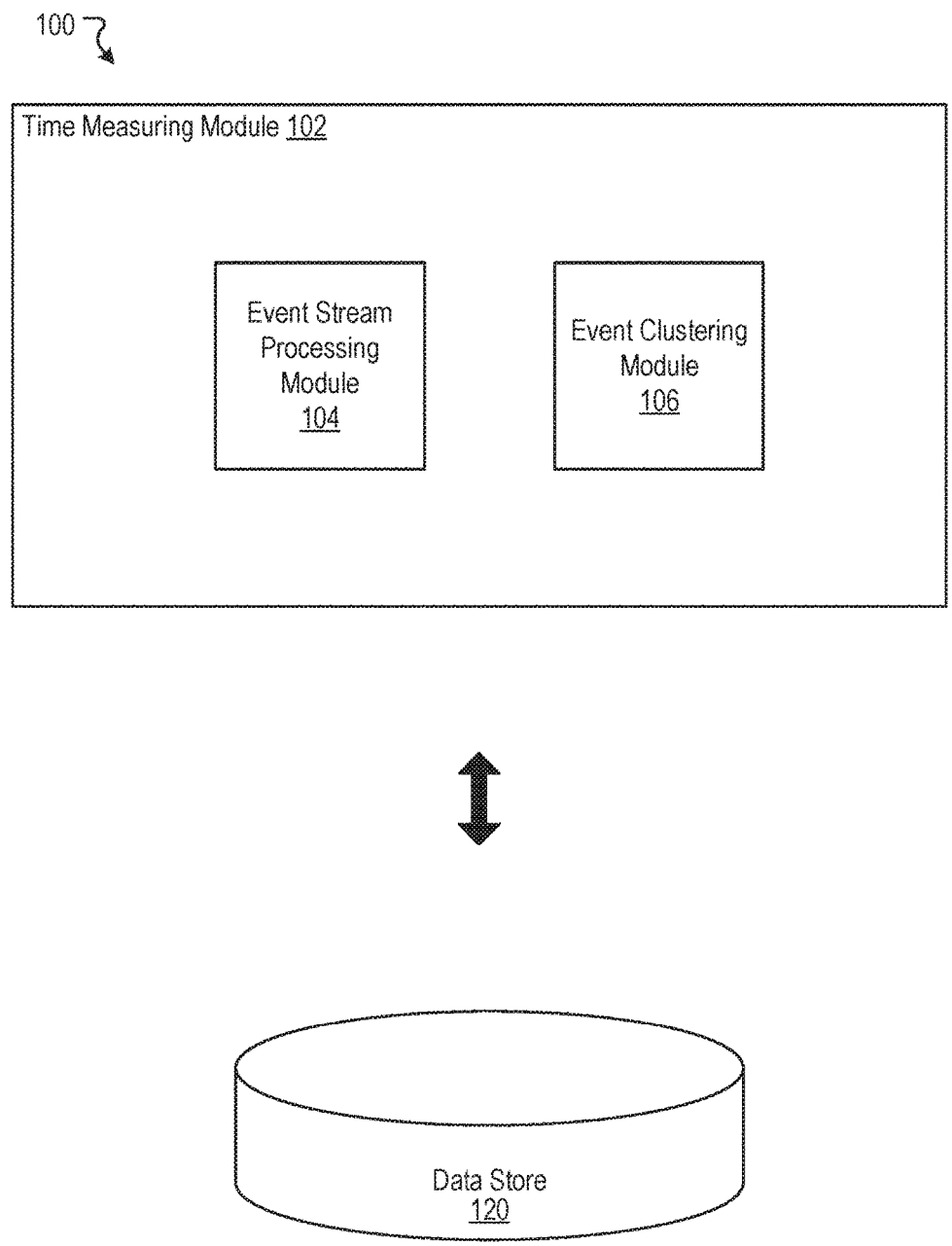
FIG. 1 illustrates an example system including an example time measuring module configured to measure an amount of time spent in an application, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Measuring Time Spent Associated with a Social Networking System

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide user profiles for various users through which users may add connections, such as friends, or publish content items. A social networking system may also provide feeds, such as a newsfeed, for various users to view and access content items.

A social networking system may provide a number of different applications associated with it for users, such as a main social networking application, a chat application, a photo application, etc. Conventional approaches specifically arising in the realm of computer technology can measure engagement with an application associated with a social networking system based on various metrics, such as a number of comments, a number of likes, etc. However, metrics used to measure engagement can vary for different applications associated with the social networking system.

An improved approach rooted in computer technology can overcome the foregoing and other disadvantages associated with conventional approaches specifically arising in the realm of computer technology. Based on computer technology, the disclosed technology can measure an amount of time spent by a user on an application associated with a social networking system. For example, an amount of time a user spends in connection with an application can be measured and attributed to different aspects associated with the application, such as different parts of the application (e.g., pages, sections, etc.) or external events. As an example, an application can include different pages, such as a feed, a profile, etc. An application can also be associated with external events or features, such as videos, games, voice over IP (VoIP) sessions, etc. An amount of time spent by a user in connection with an application and an attribution of the amount of time to appropriate aspects of the application can be referred to as a "time spent metric."

The time spent metric can be determined based on different event streams, which can keep track of different types of events or activities. For example, there can be an event stream for user activity, an event stream for navigation, an event stream for external events, etc. An event stream can be generated on a client device and sent to a server of the social networking system (e.g., periodically). For example, an event stream for user activity can be generated based on a bit array indicating an occurrence of a user event and/or a type of a user event for each unit of time (e.g., a second). Each event can be associated with a timestamp. Different event streams can be processed and merged by the server to generate sessionized time spent data. Events from different event stream can be used to generate one or more clusters based on timestamps associated with the events. A cluster can indicate a set of events that are grouped together in time. A cluster can be sessionized by attributing a portion of time in the cluster to an appropriate aspect of the application. Sessionized time spent data can indicate active intervals for a user in connection with an application and associated aspects of the application. Sessionized time spent data can be generated in or near real time. For example, clusters can be generated as events are received and can be provided to a user or other appropriate systems when determined to be sufficiently complete based on selected criteria. The time spent metric can be provided at scale and measured for every user of the social networking system. Determining the time spent metric at scale can allow more granular data to be obtained and also more granular analysis to be performed. In this manner, the time spent metric can provide a standardized metric for engagement that can be applied across various applications associated with the social networking system. The time spent metric can allow comparison between engagement of various applications.

FIG. 1 illustrates an example system 100 including an example time measuring module 102 configured to measure an amount of time spent in an application, according to an embodiment of the present disclosure. The time measuring module 102 can include an event stream processing module 104 and an event clustering module 106. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the time measuring module 102 can be implemented in any suitable combinations.

The event stream processing module 104 can receive and process event streams from client devices. An application associated with a social networking system can have one or more event streams associated with it. Event streams can include a user activity event stream, a navigation event stream, and an external event stream. Each event stream can be stored on a client device separately and sent to a server of the social networking system at various times, for example, in or near real time. The event stream processing module 104 is described in more detail herein.

The event clustering module 106 can generate clusters of events from event streams. Events from event streams can be sorted and processed to generate clusters of events that indicate active intervals of users on an application associated with the social networking system. Active intervals determined by the event clustering module 106 can be provided as sessionized time spent data. The event clustering module 106 is described in more detail herein.

All examples herein are provided for illustrative purposes, and there can be many variations and other possibilities. For example, the disclosed technology can be used in connection with any type of application. The disclosed technology can also be used in connection with any metric (e.g., for measuring engagement). The disclosed technology can also be used in connection with any type of event stream or data stream.

In some embodiments, the time measuring module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the time measuring module 102 can be, in part or in whole, implemented as software running on one or more computing devices or systems, such as on a server system or a client computing device. In some instances, the time measuring module 102 can be, in part or in whole, implemented within or configured to operate in conjunction or be integrated with a social networking system (or service), such as a social networking system 630 of FIG. 6. Likewise, in some instances, the time measuring module 102 can be, in part or in whole, implemented within or configured to operate in conjunction or be integrated with a client computing device, such as the user device 610 of FIG. 6. For example, the time measuring module 102 can be implemented as or within a dedicated application (e.g., app), a program, or an applet running on a user computing device or client computing system. It should be understood that many variations are possible.

The data store 120 can be configured to store and maintain various types of data, such as the data relating to support of and operation of the time measuring module 102. The data maintained by the data store 120 can include, for example, information relating to event streams (e.g., user activity streams, navigation streams, external event streams, etc.), events (e.g., user activity events, navigation events, external events, etc.), users, states, sorting of events, active intervals, clusters, algorithms, rules, criteria, etc. for determining clusters, last cluster store, sessionized time spent data, time spent metrics, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the time measuring module 102 can be configured to communicate and/or operate with the data store 120. In some embodiments, the data store 120 can be a data store within a client computing device. In some embodiments, the data store 120 can be a data store of a server system in communication with the client computing device.

Figure 2A:
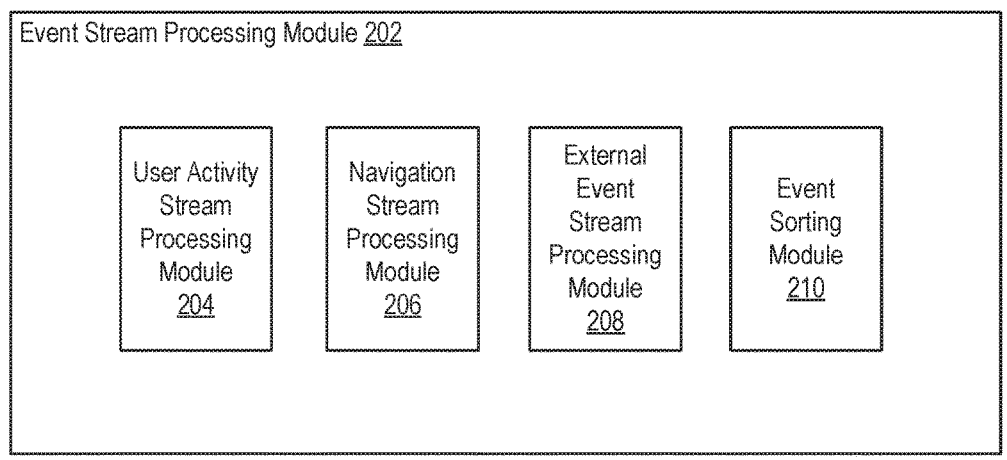
FIG. 2A illustrates an example event stream processing module configured to receive and process event streams from client devices, according to an embodiment of the present disclosure.

FIG. 2A illustrates an example event stream processing module 202 configured to receive and process event streams from client devices, according to an embodiment of the present disclosure. In some embodiments, the event stream processing module 104 of FIG. 1 can be implemented with the example event stream processing module 202. As shown in the example of FIG. 2, the example event stream processing module 202 can include a user activity stream processing module 204, a navigation stream processing module 206, an external event stream processing module 208, and an event sorting module 210.

Different types of event streams can keep track of different types of events or activities relating to an application associated with a social networking system. Events can be logged on a client device. Different types of event streams can include a user activity stream, a navigation stream, and an external event stream. A user activity stream can keep track of user events. Examples of user events can include user interactions with the application, such as selections or other manipulations in user interfaces (e.g., clicks, touch gestures, typing, etc.). A navigation stream can keep track navigation events. Examples of navigation events can include transitions between different parts of the application, such as pages of the application, sections of the application, etc. An external event stream can keep track of external events. External events can indicate events that are associated with the application but may be external to the application. Examples of external events can include viewing videos, playing games, making VoIP calls, etc. In some embodiments, an event stream can be based on a bit array that keeps track of events associated with the event stream. For example, a bit array can indicate an occurrence of an event and/or a type of an event for each unit of time (e.g., a second). Different types of event streams can be received and processed by components of the event stream processing module 202 as explained below. Different types of event streams can be sent to a server of the social networking system separately and at different times.

The user activity stream processing module 204 can receive user activity streams from client devices. A user activity stream can be based on a bit array that keeps track of an occurrence of a user event for each unit of time (e.g., a second). For example, a bit array that has a length of 60 can keep track of user events for 60 seconds. If a user event occurred for a particular unit of time, a corresponding bit in the bit array can have a value of 1, and if a user event did not occur for a particular unit of time, a corresponding bit in the bit array can have a value of 0. Each user event can be associated with a timestamp. In some embodiments, each user event can also be associated with a type of user activity, such as a selection, typing, etc. Values in the bit array can be logged and sent to a server of the social networking system as a user activity stream. Values in the bit array for a selected period of time (e.g., a minute) can be converted to an integer for sending to the server. A time for sending a user activity stream to the server can be determined as appropriate. For example, a user activity stream can be sent to the server at a selected frequency, based on a trigger event or action (e.g., a background event), at a closing of the application, at a subsequent opening of the application, etc. A user activity stream can be stored on a client device and sent to the server as a batch. A user activity stream can be sent to the server in or near real time.

The navigation stream processing module 206 can receive navigation streams from client devices. As explained above, navigation events can indicate transitions between different parts of the application. Different parts of the application can include different pages of the application, sections of the application, etc. For illustrative purposes, navigation events are explained in terms of pages, but there can be many variations and possibilities. Examples of pages can include a feed, a profile, a photos page, a message page, a notes page, etc. Each navigation event can be associated with a timestamp. A transition can include a source page and a destination page. Each navigation event can be associated with a source page and a destination page. Navigation events can be logged on a client device and sent to the server as a navigation stream. In some embodiments, a navigation stream can be based on a bit array that keeps track of an occurrence of a navigation event for each unit of time (e.g., a second). For example, a bit array that has a length of 60 can keep track of navigation events for 60 seconds. If a navigation event occurred for a particular unit of time, a corresponding bit in the bit array can have a value of 1, and if a navigation event did not occur for a particular unit of time, a corresponding bit in the bit array can have a value of 0. Values in the bit array can be logged and sent to the server as a navigation stream. Values in the bit array for a selected period of time (e.g., a minute) can be converted to an integer for sending to the server. A time for sending a navigation stream to the server can be determined as appropriate. For example, a navigation stream can be sent to the server at a selected frequency, based on a trigger event or action (e.g., a background event), at a closing of the application, at a subsequent opening of the application, etc. A navigation stream can be stored on a client device and sent to the server as a batch. A navigation stream can be sent to the server in or near real time.

The external event stream processing module 208 can receive external event streams from client devices. It can be difficult to measure an external event since there may not be any user interactions associated with the external event in the application. For example, a user can watch a video in the application, but no user activity may be captured while the user is viewing the video. However, the user is active during an amount of time the user spends watching the video. Accordingly, accounting for external events can provide more accurate information for a time spent metric. External event information can be provided by an external application or source. Each external event can be associated with one or more timestamps. In some embodiments, each external event can include a start time and an end time. External events can be logged on a client device and sent to the server as an external event stream. A time for sending an external event stream to the server can be determined as appropriate. For example, an external event stream can be sent to the server at a selected frequency, based on a trigger event or action (e.g., a background event), at a closing of the external application, at a subsequent opening of the external application, etc. An external event stream can be stored on a client device and sent to the server as a batch. An external event stream can be sent to the server in or near real time.

The event sorting module 210 can clean and sort different event streams received from client devices. A large number of event streams for users can be received by the server at the same time. For example, the server can receive different event streams in or near real time. The event sorting module 210 can sort event streams for different users so that events associated with a user can be processed. For example, events in an event stream for a user can be associated with a state associated with the user. A state can be based on one or more attributes associated with a user. For example, a state can be determined based on an application identifier (ID), a user identifier (ID), a device identifier (ID), etc. Events for a particular user can be sorted to a corresponding state and accumulated for a selected period of time (e.g., several minutes). Then, accumulated events associated with the particular user can be processed to determine a time spent metric for the particular user. The event sorting module 210 can also clean data in event streams prior to sorting. For example, one or more tests can be run to check values associated with events, and any events that fail the tests can be removed. In some embodiments, the event sorting module 210 can differentiate between events for a user received from different devices associated with the user. For example, the user can have multiple devices, and there can be a state for each of the multiple devices. Events from different devices of the user can be sorted and associated with corresponding states for the devices. All examples herein are provided for illustrative purposes, and there can be many variations and other possibilities.

Figure 2B:
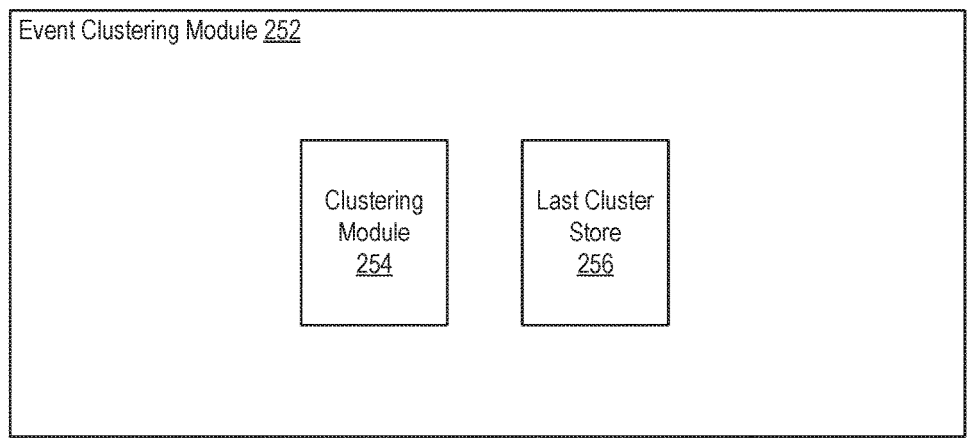
FIG. 2B illustrates an example event clustering module configured to generate clusters of events from event streams, according to an embodiment of the present disclosure.

FIG. 2B illustrates an example event clustering module 252 configured to generate clusters of events from event streams, according to an embodiment of the present disclosure. In some embodiments, the event clustering module 106 of FIG. 1 can be implemented with the example event clustering module 252. As shown in the example of FIG. 2, the example event clustering module 252 can include a clustering module 254 and a last cluster store 256.

The clustering module 254 can determine clusters of events for a user based on timestamps associated with events. Different types of event streams for a user can be received by a server associated with a social networking system at different times. For example, a navigation stream for a user may be received by the server earlier than a user event stream for the user. In addition, different events within an event stream can be processed by the server out of order. For example, a batch can be processed in segments, and events within a segment can be processed out of order. Accordingly, events for a particular user can be merged into one or more clusters based on time information to determine a time spent metric for the user.

The clustering module 254 can construct clusters based on an algorithm, rules, parameters, etc. A cluster can indicate an active interval of a user in connection with an application associated with a social networking system. A cluster can include one or more events and form a unit of events that can be processed independently of other clusters. A cluster can be generated based on one or more user events. The clustering module 254 can determine clusters based on time gaps between user events. A timeout threshold value can indicate an amount of time between two user events that can be considered to end an active interval. The timeout threshold value can be determined as appropriate, for example, based on experiments or empirical data. For example, the timeout threshold value can be 30 seconds. When the clustering module 254 receives a user event, a cluster can be formed for the user event. If an amount of time between an earlier user event and a later user event does not exceed the timeout threshold value, an interval between the two user events can be considered active, and clusters for the two user events can be merged. If an amount of time between an earlier user event and a later user event exceeds the timeout threshold value, an interval between the two user events can be considered inactive, and a cluster for the earlier user event and a cluster for the later event can remain separate. Clusters can be formed based on user events that have been sorted for a user and are ready for processing. User events can be received out of order, but the clustering module 254 can merge user events into existing clusters or form new clusters including user events based on timestamps associated with the user events. Many variations are possible.

The clustering module 254 can attribute an active interval represented by a cluster to one or more corresponding pages of the application based on navigation events. A navigation event can indicate a transition between pages and include a source page and a destination page. A portion of an active interval that corresponds to an interval between an earlier navigation event and a later navigation event can be attributed to a destination page of the earlier navigation event and/or a source page of the later navigation event. For example, a first navigation event can indicate a transition from a feed page to a photos page, and a second navigation event can indicate a transition from a photos page to a messages page. The first navigation event can specify the feed page as a source page and the photos page as a destination page, and the second navigation event can specify the photos page as a source page and the messages page as a destination page. A portion of an active interval that is between the first navigation event and the second navigation event can be attributed to the photos page. A portion of an active interval that is between the first navigation event and a prior navigation event (or a start of the active interval) can be attributed to the feed page. A portion of an active interval that is between the second navigation event and a subsequent navigation event (or an end of the active interval) can be attributed to the messages page. In some cases, a source page can be null, for example, when the application is initially accessed (e.g., from a home screen of a mobile device, from a desktop of a device, etc.). Many variations are possible.

The clustering module 254 can also add external events to clusters. As explained above, an external event can indicate a start time and an end time of the external event. An interval between the start time and the end time of an external event can be considered active. If the interval overlaps with or is included in an existing cluster, the interval can be added to the existing cluster. If the interval does not overlap with an existing cluster, a new cluster can be added for the interval. The interval can be attributed to the external event. If the interval overlaps with an active interval attributed to a page, an overlapping portion can be attributed to both the page and the external event. A non-overlapping portion can be attributed only to the external event. The interval can exceed the timeout threshold value. For example, a user may watch a video for an interval that exceeds the timeout threshold value, but the interval can be considered active. Many variations are possible.

The clustering module 254 can determine when a cluster is ready to output. A cluster that includes appropriate page attributions and/or includes appropriate external events can be referred to as a "sessionized cluster" and can be ready for output. For example, a cluster can be provided or output to a user, other applications, other systems, etc. Because event streams that include events for the same time or time period can be received by the server at different times, there can be a delay in receiving all events that should belong to a cluster. In some cases, the delay can be one or more hours. Accordingly, a cluster can be output if it is likely that most of events belonging to the cluster have been received. The clustering module 254 can determine when a cluster is ready to output based on selected criteria. For example, a cluster can be considered ready for output if a number of recently processed events that are outside the cluster satisfies a threshold value. As another example, a cluster can be considered ready for output if an amount of time that has passed since an end time of the cluster satisfies a threshold value. Criteria for determining whether to output a cluster can be selected to balance latency and accuracy. Specifying a longer period of time to receive events can provide more accurate results, but clusters may be provided with a longer delay. Specifying a shorter period of time to receive events can provide less accurate results, but clusters can be provided more quickly. A cluster can be stored in memory while processing and can be removed from memory after the cluster is output. Many variations are possible.

Constructing clusters can be based on one or more specials rules or events that can indicate an end of an active interval. For example, a background event or another special event can indicate that a user is no longer active in the application, and an active interval can be assumed to have ended when such an event is received. The active interval can be assumed to have ended even if an amount of time between two user events does not exceed the timeout threshold value. For example, the amount of time between the two user events can be less than the timeout threshold value, but if there is an intervening background event, a previous cluster can end with the background event, and a new cluster can start with a later user event of the two user events. In some embodiments, background events can be received separately from a navigation stream. In other embodiments, background events can be received in the navigation stream. Background events and/or other special events can be logged on a client device and sent to the server as a special event stream. A time for sending a special event stream to the server can be determined as appropriate. For example, a special event stream can be sent to the server at a selected frequency, based on a trigger event or action (e.g., a background event), at a closing of the application, at a subsequent opening of the application, etc. A special event stream can be stored on a client device and sent to the server as a batch. A special event stream can be sent to the server in or near real time.

The last cluster store 256 can store one or more recently processed or output clusters for a user. As mentioned above, an event that should belong to a cluster can be received by the server after a long delay, and the cluster to which the event should belong may already have been output. Therefore, the clustering module 254 may not be aware of any previously output clusters and create a new cluster including the event, which may lead to duplicating an active interval or a portion of an active interval. In order to avoid duplication, information about one or more clusters that have been last processed for a user can be stored in the last cluster store 256. In some embodiments, the information about one or more clusters can include simplified versions of clusters that have been output. For example, information that is no longer needed can be removed from a cluster after outputting the cluster, and the cluster can be stored in the last cluster store 256 with a start time and an end time associated with the cluster. The clustering module 254 can refer to the information about one or more clusters that have been processed and check whether an interval associated with a cluster overlaps with a previously output cluster. If the interval overlaps, the clustering module 254 can only include in the cluster a portion of the interval that does not overlap with the previously output cluster. If the interval is completely included in the previously output cluster, the clustering module 254 may not output the cluster to the user or to other systems.

In this way, clusters can be constructed and sessionized for users. Sessionized time spent data can include sessionized clusters and can be provided to users and other systems. Sessionized time spent data can be provided at scale. For example, sessionized time spent data can be provided for each user. An amount of time spent in an application can be measured for each user, and sessionized time spent data can be provided for each user. Therefore, the disclosed technology can obtain data and analyze data at a granular level. For example, experiments can be performed for a selected subset of users since accurate data can be obtained from each user.

Figure 3:
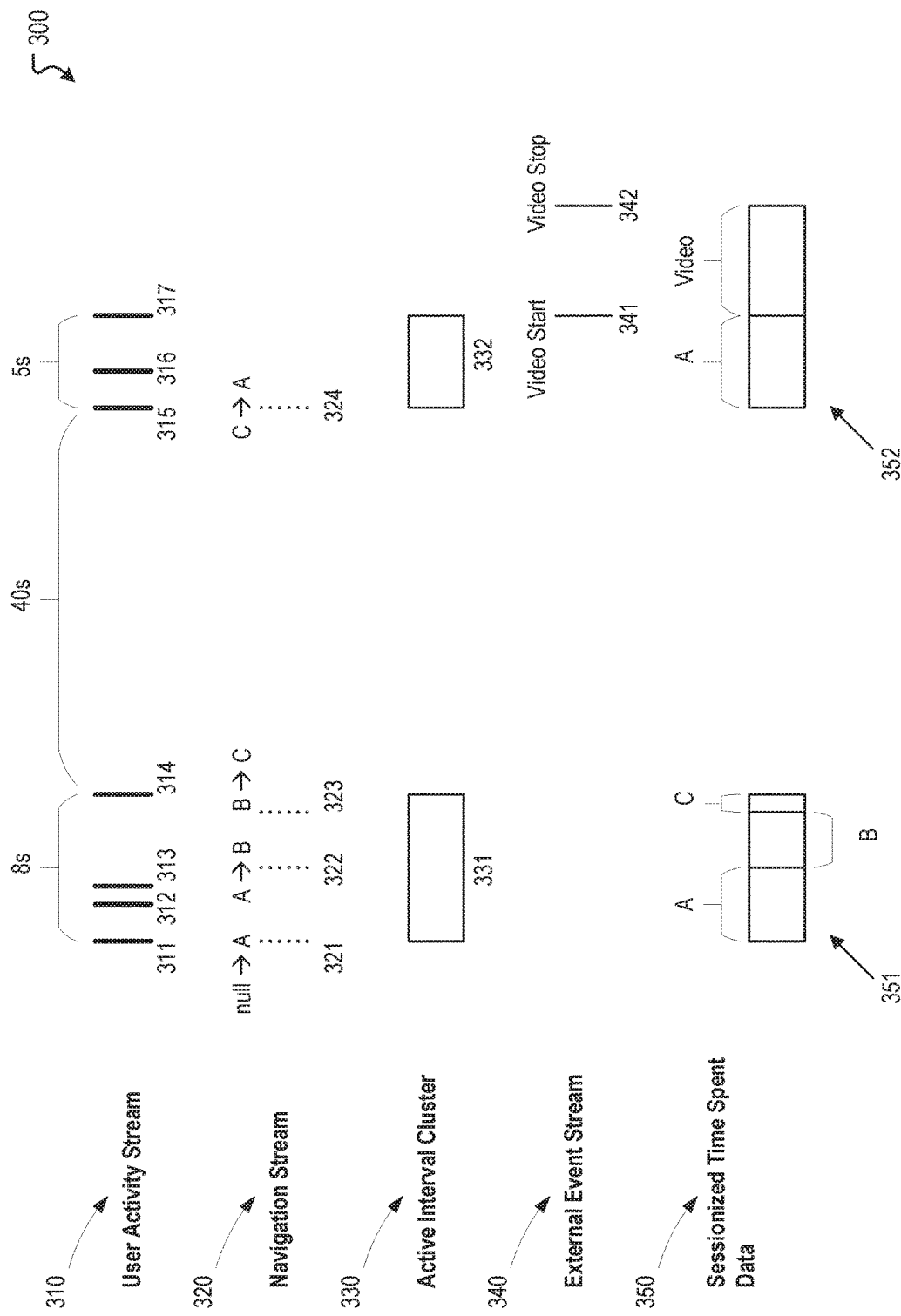
FIG. 3 illustrates an example scenario for measuring an amount of time spent in an application, according to an embodiment of the present disclosure.

FIG. 3 illustrates an example scenario 300 for measuring an amount of time spent in an application, according to an embodiment of the present disclosure. The example scenario 300 illustrates constructing clusters based on event streams received by a server associated with a social networking system. Event streams received by the server include a user activity stream 310, a navigation stream 320, and an external event stream 340. One or more active interval clusters 330 can be created based on user events included in the user activity stream 310. In the example scenario 300, the user activity stream 310 includes user events 311 through 317. User events 311, 312, 313, and 314 are within a span of 8 seconds. A user event 314 and a user event 315 are 40 seconds apart. User events 315, 316, and 317 are within a span of 5 seconds. In the example scenario 300, a timeout threshold value can be 30 seconds. Respective intervals between the user events 311, 312, 313, and 314 do not exceed the timeout threshold value, and clusters for the user events 311, 312, 313, and 314 can be merged to form an active interval cluster 331. The cluster 331 can indicate an active interval of 8 seconds. An interval between the user event 314 and the user event 315 exceeds the timeout threshold value. Therefore, a cluster for the user event 315 is not merged with the cluster 331 for the user events 311, 312, 313, and 314. Respective intervals between the user events 315, 316, and 317 do not exceed the timeout threshold value, and clusters for the user events 315, 316, and 317 can be merged to form an active interval cluster 332. The cluster 332 can indicate an active interval of 5 seconds.

The navigation stream 320 includes navigation events 321 through 324. A navigation event 321 indicates a transition from null to page A. The navigation event 321 occurs at the beginning of the cluster 331. A navigation event 322 indicates a transition from page A to page B. The navigation event 321 occurs 4 seconds after the beginning of the cluster 331. A navigation event 323 indicates a transition from page B to page C. The navigation event 321 occurs 7 seconds after the beginning of the cluster 331. A navigation event 324 indicates a transition from page C to page A. The navigation event 321 occurs 4 seconds at the beginning of the cluster 332. The clusters 331 and 332 can be attributed to one or more corresponding pages based on the navigation events 321, 322, 323, and 324. For example, first 4 seconds of the cluster 331 can be attributed to page A, next 3 seconds of the cluster 331 can be attributed to page B, and next 1 second of the cluster 331 can be attributed to page C. All 5 seconds of the cluster 332 can be attributed to page A. The clusters 331 and 332 can be included in sessionized time spent data 350 after being attributed to the appropriate pages.

The external event stream 340 includes a video external event. The video external event has a start time 341 and a stop time 342. An interval between the start time 341 and the stop time 342 can be added to the cluster 332. In the example scenario, the interval between the start time 341 and the stop time 342 can be 6 seconds. The interval can be attributed to the video external event.

The sessionized time spent data 350 includes sessionized clusters 351 and 352, which include page attributions and/or external events. As explained above, the sessionized clusters 351 and 352 can be output based on selected criteria. For example, each sessionized cluster 351, 352 can be output when it is determined most or all of events belonging to each sessionized cluster have been received by the server based on the selected criteria.

Figure 4:
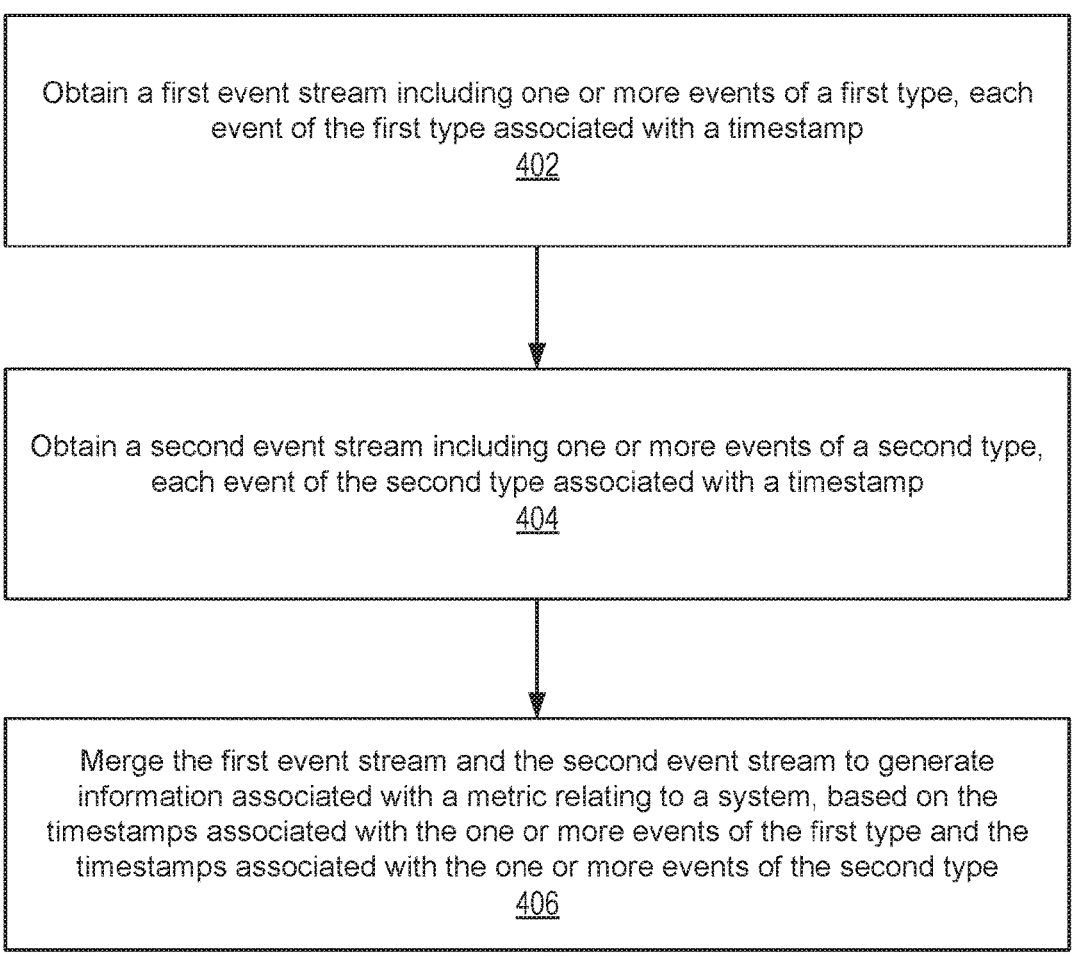
FIG. 4 illustrates an example first method for measuring an amount of time spent in an application, according to an embodiment of the present disclosure.

FIG. 4 illustrates an example first method 400 for measuring an amount of time spent in an application, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can obtain a first event stream including one or more events of a first type, each event of the first type associated with a timestamp. At block 404, the example method 400 can obtain a second event stream including one or more events of a second type, each event of the second type associated with a timestamp. At block 406, the example method 400 can merge the first event stream and the second event stream to generate information associated with a metric relating to a system, based on the timestamps associated with the one or more events of the first type and the timestamps associated with the one or more events of the second type. Other suitable techniques that incorporate various features and embodiments of the present disclosure are possible.

Figure 5:
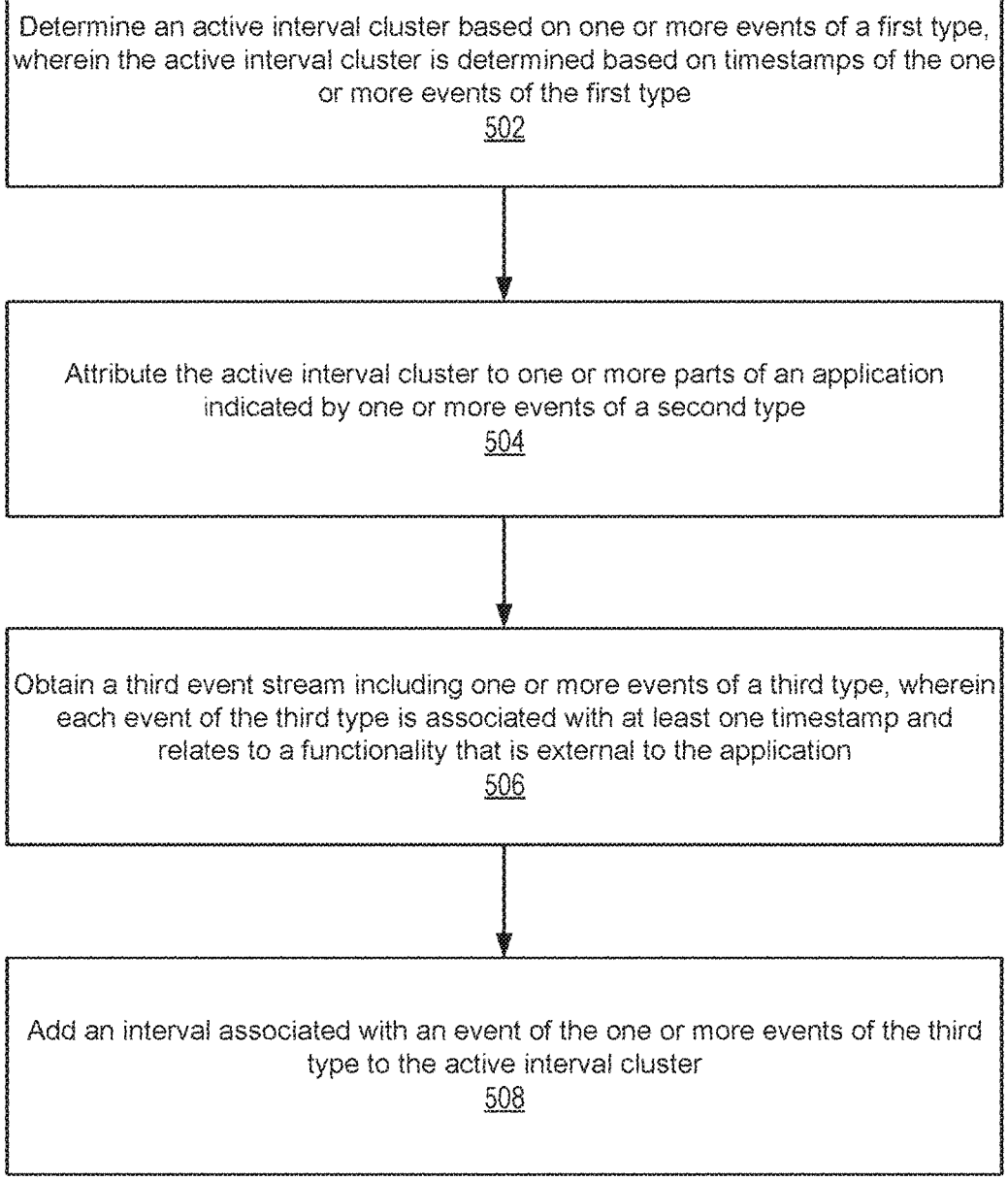
FIG. 5 illustrates an example second method for measuring an amount of time spent in an application, according to an embodiment of the present disclosure.

FIG. 5 illustrates an example second method 500 for measuring an amount of time spent in an application, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can determine an active interval cluster based on one or more events of a first type, wherein the active interval cluster is determined based on timestamps of the one or more events of the first type. The one or more events of the first type can be similar to the one or more events of the first type explained in connection with FIG. 4. In some embodiments, the determining the active interval cluster comprises determining whether an interval between two events of the one or more events of the first type indicated by the timestamps of the two events exceeds a threshold value. At block 504, the example method 500 can attribute the active interval cluster to one or more parts of an application indicated by one or more events of a second type. The one or more events of the second type can be similar to the one or more events of the second type explained in connection with FIG. 4. In some embodiments, each of the one or more events of the second type indicates a transition from a first part of the application to a second part of the application, and the attributing the active interval cluster is based on the transitions indicated by the one or more events of the second type. At block 506, the example method 500 can obtain a third event stream including one or more events of a third type, wherein each event of the third type is associated with at least one timestamp and relates to a functionality that is external to the application. At block 508, the example method 500 can add an interval associated with an event of the one or more events of the third type to the active interval cluster. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
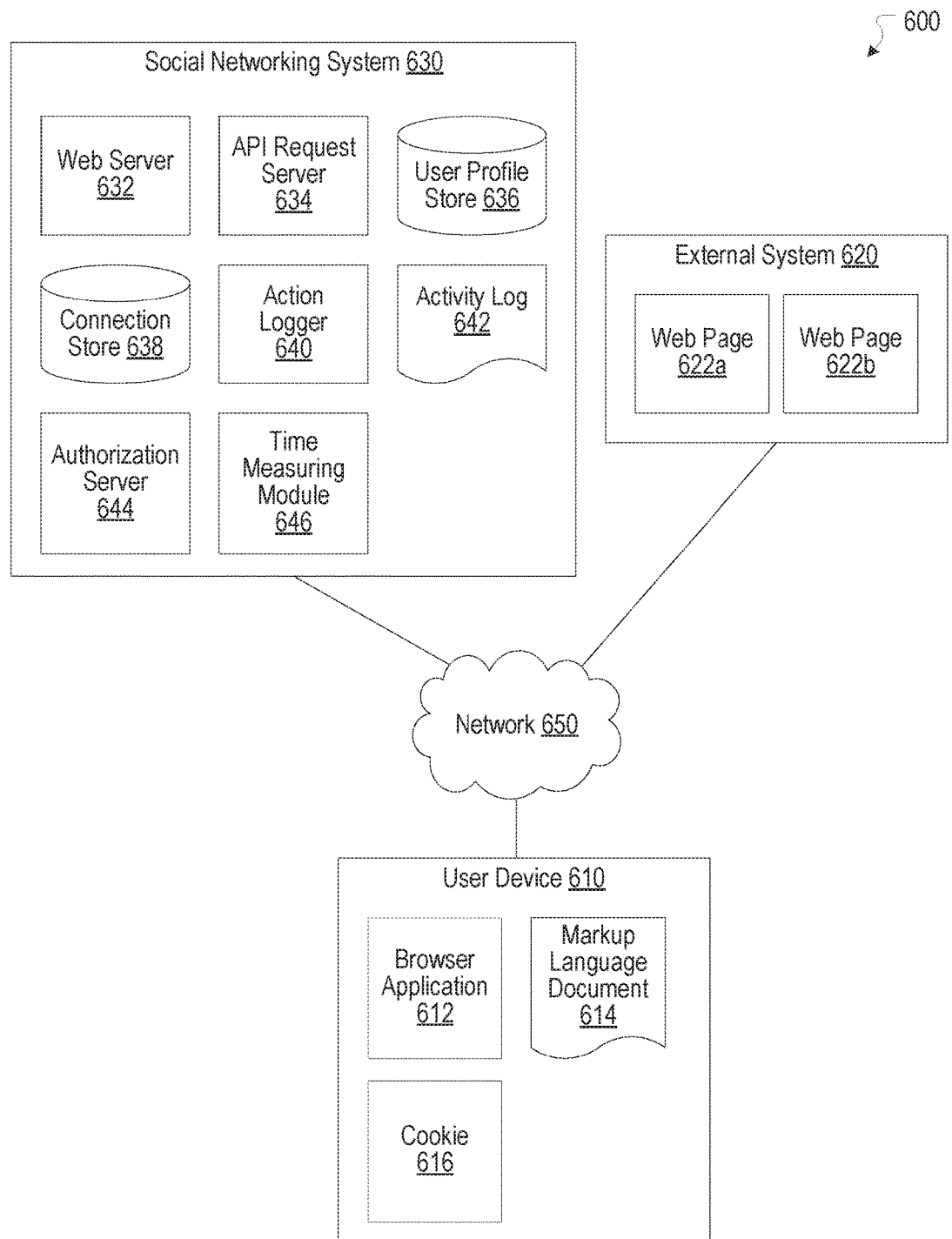
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a time measuring module 646. The time measuring module 646 can be implemented with the time measuring module 102, as discussed in more detail herein. In some embodiments, one or more functionalities of the time measuring module 646 can be implemented in the user device 610.

Hardware Implementation

Figure 7:
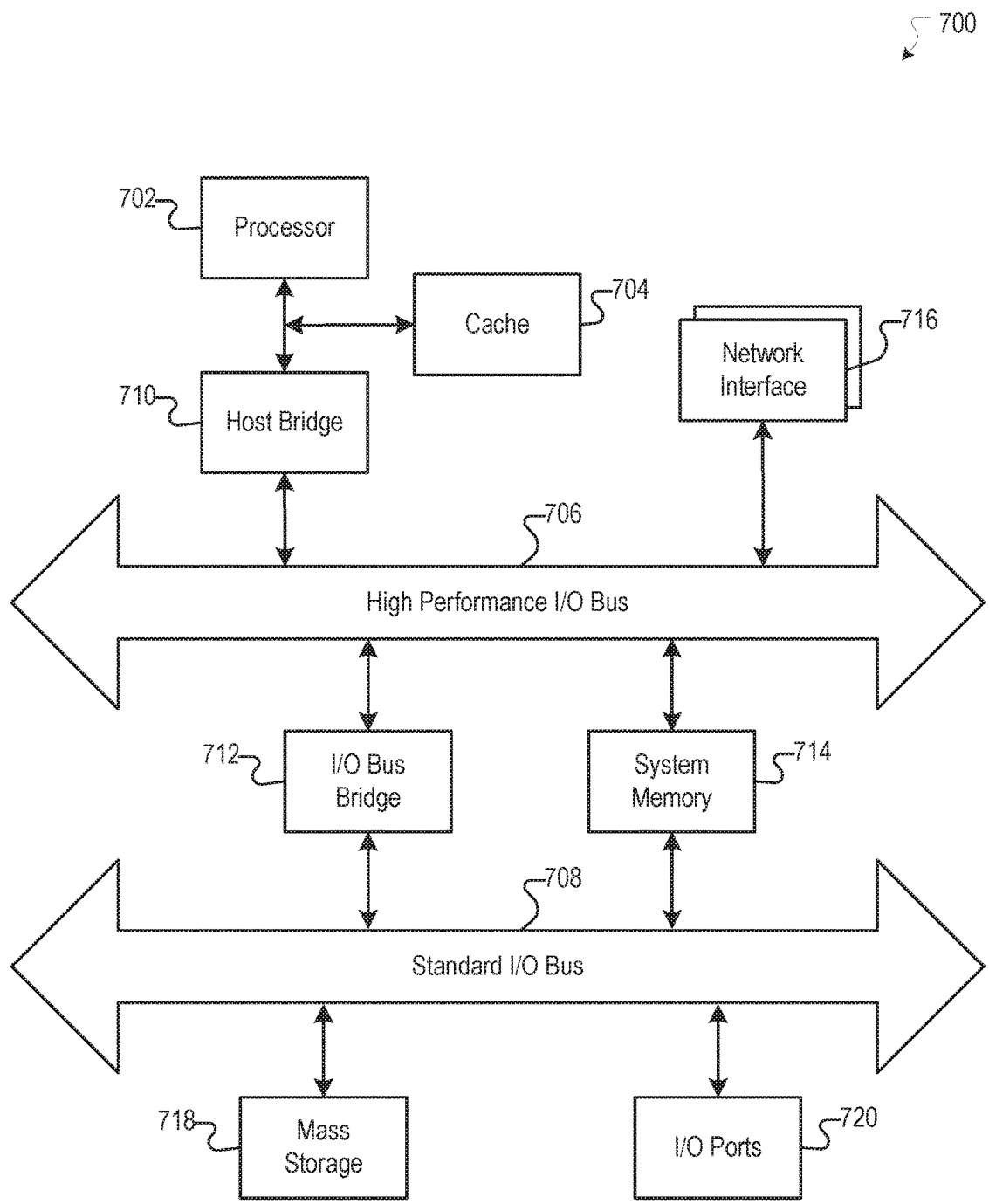
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    obtaining, by a computing system, a first event stream including two or more events of a first type, each event of the first type associated with a timestamp;
    obtaining, by the computing system, a second event stream including two or more events of a second type, each event of the second type associated with a timestamp;
    determining, by the computing system, an active interval cluster based on the timestamps of the two or more events of the first type; and
    merging, by the computing system, the first event stream and the second event stream, during the active interval cluster, to generate information associated with a metric relating to a system, based on the timestamps associated with the two or more events of the first type and the timestamps associated with the two or more events of the second type, wherein the system is a social networking system and the metric is an amount of time spent by a user of the social networking system on an application.

2. The computer-implemented method of claim 1, wherein each of the two or more events of the first type relates to a user activity and each of the two or more events of the second type relates to a user navigation associated with the application.

3. The computer-implemented method of claim 1, wherein the determining the active interval cluster comprises determining whether an interval between two events of the two or more events of the first type indicated by the timestamps of the two events exceeds a threshold value.

4. The computer-implemented method of claim 1, further comprising attributing the active interval cluster to one or more parts of the application indicated by the two or more events of the second type.

5. The computer-implemented method of claim 4, wherein each of the two or more events of the second type indicates a transition from a first part of the application to a second part of the application, and the attributing the active interval cluster is based on the transitions indicated by the two or more events of the second type.

6. The computer-implemented method of claim 4, further comprising obtaining a third event stream including two or more events of a third type, wherein each event of the third type is associated with at least one timestamp and relates to a functionality that is external to the application.

7. The computer-implemented method of claim 6, further comprising adding an interval associated with an event of the two or more events of the third type to the active interval cluster.

8. The computer-implemented method of claim 1, wherein the information associated with the metric is generated in or near real time.

9. A system comprising:
   at least one hardware processor; and
   a memory storing instructions that, when executed by the at least one processor, cause the system to perform:
      obtaining a first event stream including two or more events of a first type, each event of the first type associated with a timestamp;
      obtaining a second event stream including two or more events of a second type, each event of the second type associated with a timestamp;
      determining an active interval cluster based on the timestamps of the two or more events of the first type; and
      merging the first event stream and the second event stream, during the active interval cluster, to generate information associated with a metric relating to a system, based on the timestamps associated with the two or more events of the first type and the timestamps associated with the two or more events of the second type, wherein the system is a social networking system and the metric is an amount of time spent by a user of the social networking system on an application.

10. The system of claim 9, wherein each of the two or more events of the first type relates to a user activity and each of the two or more events of the second type relates to a user navigation associated with the application.

11. The system of claim 9, wherein the instructions further cause the system to perform attributing the active interval cluster to one or more parts of the application indicated by the two or more events of the second type.

12. A non-transitory computer readable medium including instructions that, when executed by at least one hardware processor of a computing system, cause the computing system to perform a method comprising:
   obtaining a first event stream including two or more events of a first type, each event of the first type associated with a timestamp;
   obtaining a second event stream including two or more events of a second type, each event of the second type associated with a timestamp;
   determining an active interval cluster based on the timestamps of the two or more events of the first type; and
   merging the first event stream and the second event stream, during the active interval cluster, to generate information associated with a metric relating to a system, based on the timestamps associated with the two or more events of the first type and the timestamps associated with the two or more events of the second type, wherein the system is a social networking system and the metric is an amount of time spent by a user of the social networking system on an application.

13. The non-transitory computer readable medium of claim 12, wherein each of the two or more events of the first type relates to a user activity and each of the two or more events of the second type relates to a user navigation associated with the application.

14. The non-transitory computer readable medium of claim 12, wherein the method further comprises attributing the active interval cluster to one or more parts of the application indicated by the two or more events of the second type.

* * * * *